(No Model.)
J. R. LITTLE.
IRON WHEEL.
No. 299,151. Patented May 27, 1884.
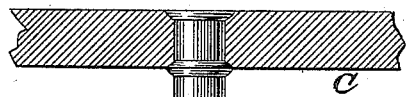
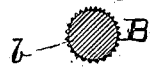
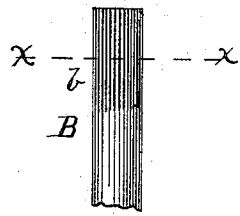
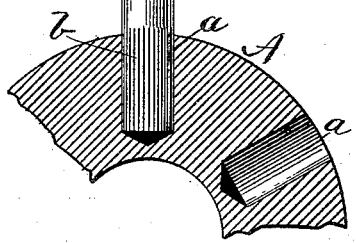
Witnesses:
Frank J. Blanchard
H. W. Richards
Inventor:
James R. Little,
By W. B. Richards,
Attorney.

UNITED STATES PATENT OFFICE.

JAMES R. LITTLE, OF QUINCY, ILLINOIS, ASSIGNOR OF THREE-FOURTHS TO CYLON SMITH, THOMAS HILL, AND PLINY BLISS WILLIAMS, ALL OF SAME PLACE.

IRON WHEEL.

SPECIFICATION forming part of Letters Patent No. 299,151, dated May 27, 1884.

Application filed August 11, 1883. (No model.)

*To all whom it may concern:*

Be it known that I, JAMES R. LITTLE, a citizen of the United States, residing at Quincy, in the county of Adams and State of Illinois, have invented certain new and useful Improvments in Iron Wheels; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

In that class of iron wheels in which the spokes are secured to the hub by driving the spokes into prepared holes in the hub great difficulty has been experienced in getting the spokes as firmly and securely fixed in the hub as was necessary in order to produce a strong, solid, and durable wheel; and the object of my invention is to overcome this difficulty by means of spokes prepared and seated in the hub, as hereinafter fully described.

In the accompanying drawings, which illustrate my improvement, Figure 1 is a sectional elevation of a portion of a hub and rim and elevation of spoke. Fig. 2 is a side elevation of a spoke prepared in accordance with my improvement. Fig. 3 is a sectional plan in line $x\,x$, Fig. 2.

Referring to the drawings by letter, A is the hub, B the spokes, and C the rim, of a wheel, formed of iron, steel, brass, or other metal. The ends $b$ of the spokes are corrugated or roughened on their outer surfaces in the direction of their lengths, as shown. The corrugations on the spokes may be formed by dies or by rolls, but preferably by rolls, which will, at the same time they form the corrugations, also properly size and round the ends where corrugated. The holes $a$ in the hub being prepared by drilling or by casting and reaming in any ordinary manner so that they are round in their cross-sections, the ends of the spokes, prepared as hereinbefore described, may be driven or pressed into said holes, and the corrugations on their rounded ends will yield and cause them to perfectly fit therein, and thus produce that firmness and rigidity of union between the spoke and hub which must exist to produce a wheel strong, solid, and durable as to these parts.

At Fig. 1 I have shown a preferred method of uniting the spokes and wheel-rim C, which will, together with my herein-described method of securing the spokes in the hub, form a superior wheel. This method of riveting the spokes to the rim is fully shown and described in my Patent No. 273,746, and need not be more fully described or shown herein.

Having thus described my invention, what I claim as new, and desire to secure by Letters Patent, is—

1. In an iron wheel, the combination, with an iron hub having holes $a$ for the spokes, of spokes having longitudinal corrugated ends fitted to and driven or forced firmly into the holes $a$, substantially as and for the purpose specified.

2. In an iron wheel, the combination, with an iron hub having holes $a$ for the spokes, of spokes having longitudinal corrugated inner ends fitted to and driven or forced into the holes $a$ in the hub, and outer ends riveted to the rim, substantially as and for the purpose specified.

In testimony whereof I affix my signature in presence of two witnesses.

JAMES R. LITTLE.

Witnesses:
JOHN B. RICKER,
WM. H. LONG.